United States Patent [19]

Kordel

[11] Patent Number: 4,927,316
[45] Date of Patent: May 22, 1990

[54] CARGO SPACE UTILIZATION

[75] Inventor: Wojciech J. Kordel, Great Budworth, United Kingdom

[73] Assignee: Joloda Plc., Liverpool, United Kingdom

[21] Appl. No.: 219,587

[22] Filed: Jul. 15, 1988

[30] Foreign Application Priority Data

Jul. 18, 1987 [GB] United Kingdom ............... 8716996

[51] Int. Cl.⁵ .................................................. B60P 1/38
[52] U.S. Cl. ........................................ 414/510; 414/521
[58] Field of Search ............... 414/521, 528, 507, 509, 414/510, 512, 514, 529-536; 198/607, 803.2, 851, 842

[56] References Cited

U.S. PATENT DOCUMENTS

| 648,851 | 5/1900 | Cohen | 198/607 |
|---|---|---|---|
| 2,464,098 | 3/1949 | Pittlick | 414/521 X |
| 2,553,484 | 5/1951 | Stauch | 414/521 X |
| 2,675,934 | 4/1954 | Kennedy | 414/534 X |
| 2,784,836 | 3/1957 | Le Tourneau | 198/851 X |
| 3,064,837 | 11/1962 | Manney | 414/528 |
| 3,342,354 | 9/1967 | Behr | 414/521 |
| 3,344,902 | 10/1967 | Crawford | 198/607 X |
| 3,529,738 | 9/1970 | Hunt | 414/528 X |
| 3,917,092 | 11/1975 | McGinnis | 414/528 |
| 3,927,780 | 12/1975 | Dearlove | 414/528 X |
| 3,998,343 | 12/1976 | Fors | 414/521 X |
| 4,609,320 | 9/1986 | Rubin | 198/842 X |
| 4,616,957 | 10/1986 | Burrows et al. | 414/528 X |
| 4,765,455 | 8/1988 | Matsuno et al. | 198/851 X |

FOREIGN PATENT DOCUMENTS

| 664624 | 5/1965 | France | 414/528 |
|---|---|---|---|
| 54-6166 | 3/1979 | Japan | 414/521 |

Primary Examiner—David A. Bucci
Attorney, Agent, or Firm—Rogers, Howell & Haferkamp

[57] ABSTRACT

A moving floor for a vehicle, trailer or container body especially for fitting on top of the floor of same, which moving floor provides maximum load entry height at the rear door frame/loading aperture of the body and improved load space utilization within the body behind the rear door frame while accommodating the drive motors therefor within the depth of the moving floor, to that end of the moving floor has the cargo receiving surface inclined relative to the body floor/roof giving decreasing depth to the moving floor in a direction towards the rear door frame/loading aperture. The moving floor comprises a pair of transversely spaced endless chains entrained around a drive pulley at the end remote from the loading aperture and around a smaller return pulley at the loading aperture end thereof. The chain carries therebetween transverse slats defining the movable cargo receiving surface.

9 Claims, 2 Drawing Sheets

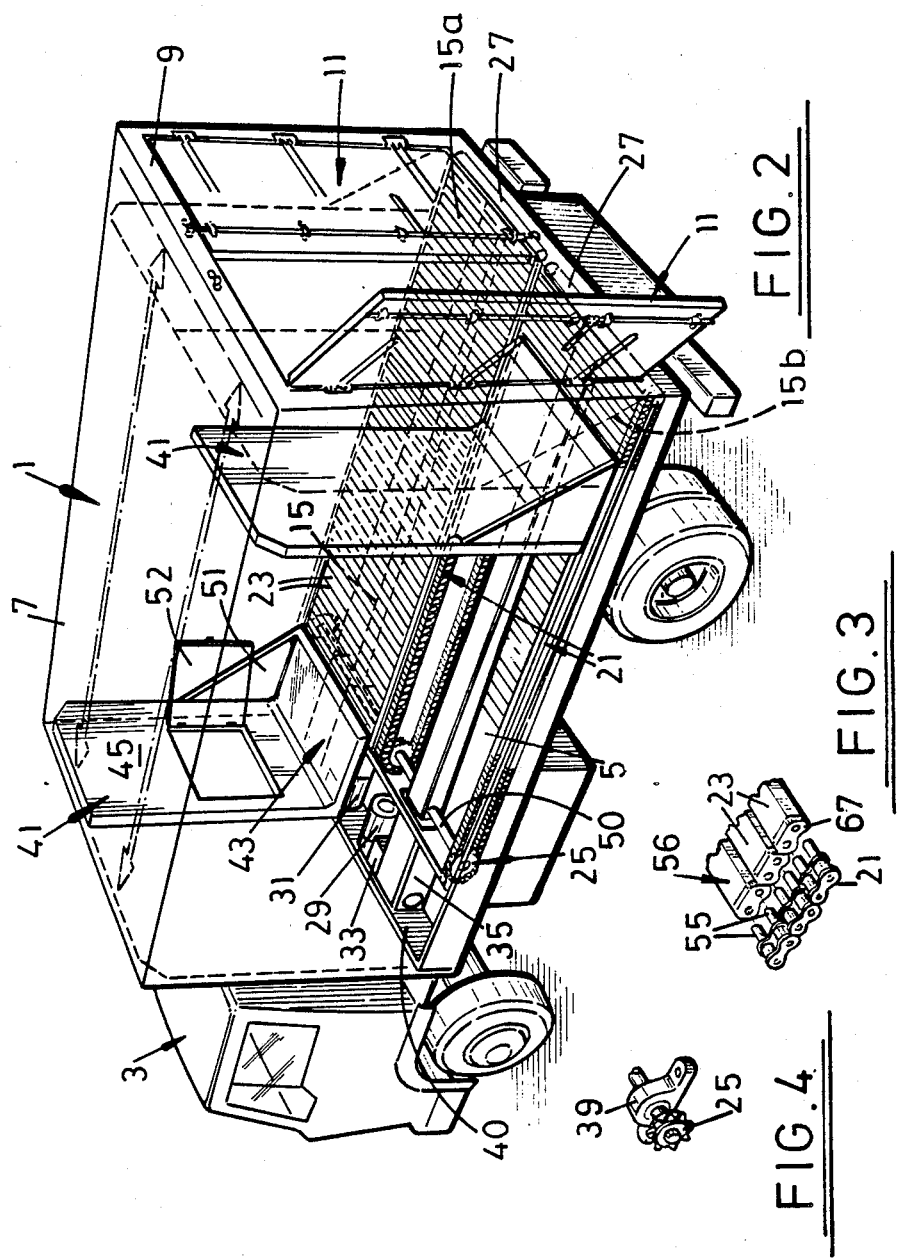

CARGO SPACE UTILIZATION

The present invention relates to cargo space utilisation, with particular application to loading vehicle, trailer or container bodies.

A typical vehicle, trailer or container body for transporting cargo is box like with a rear door frame aperture of considerable section, effectively reducing the available height for introducing cargo relative to the overall height between body floor and roof within the rear door frame aperture, say by the order of 6" (15 cm) and over the length of the body. Thus, the height of cargo which can be introduced into the container in one unit is limited by the size of the door aperture. Usually cargo is palletized for removal and introduction by a fork lift. This further reduces the allowable cargo height as maneuvering room is required, say of the order of 6" (15 cm) for pick up and put down. Over the length of a container this results in considerable amount of unoccupied space, i.e. only fresh air being transported.

The amount of cargo which can be carried is further reduced where the body is fitted with a moving floor of known design as the motors and sprockets around which the floor is entrained take up something like a further 12" (30 cm) in height of available cargo space along the whole length of the body.

From consideration of the above it has been realized that considerable economies could be achieved if the presently wasted space can be reduced, and accordingly it is an aim of the present invention to provide for improved cargo space utilization especially for an otherwise standard box like format vehicle or container body save for say provision of a moving floor.

Accordingly, the present invention provides a moving floor for a vehicle or container body, the depth of which moving floor decreases over its length towards an access door frame/loading aperture of the body.

The invention also provides a box-like cargo holding body or container having a frame defining a loading aperture between the underside of a lintel thereof and a cargo loading surface, which lintel projects below the roof line of the body or container dictating maximum cargo height at the loading aperture, and a moving floor to the body or container providing said cargo loading surface, which cargo loading surface is at progressively reduced spacing from the roof line in a direction along its length from the loading aperture into the body.

The invention provides maximum load entry height at a rear door frame/loading aperture of the body and improved load space utilization within the body behind the rear door frame whilst accommodating the drive motors for the moving floor within the depth of the moving floor. This makes it particularly suitable for fitting onto existing insitu floors of such bodies or containers.

For a typical application in which the body is box like with the floor and roof parallel to one another the cargo receiving surface of the moving floor is angled relative to the floor i.e. closer to it at the rear door frame/loading aperture than at the other end of the body floor. We are particularly concerned with fitting moving floors into existing vehicles with an insitu floor without having to modify same, although it will be understood that the principle could also be applied to custom built vehicles to maximize load space otherwise limited by the rear door frame sizing.

In a practical embodiment the angling, giving in effect a tapered configuration (in section) to the moving floor assembly, is achieved by arranging for the moving floor to pass around small bearings/pulleys at the door aperture end. Such bearings or pulleys are of small diameter, indeed of or approaching the minimum diameter around which the moving floor can be turned around allowing of course for adequate performance in terms of strength and wear.

We find a particularly advantageous construction to arise from the use of pairs of chains (e.g. roller chain) running substantially the length of the body or as otherwise desired, and entrained, at the door aperture end, around simple plain bearings in the form of bushes or sleeves. Indeed we find that forming such bearings of a low friction plastics material, such as PTFE, gives a particularly compact construction and takes the loading quite satisfactory. The other end of the chain is entrained around a drive sprocket to provide the required driving force and which is larger than the aforementioned bearings at the loading end so giving rise to the tapered configuration of the moving floor.

We prefer to construct the moving floor in the form of a slatted conveyor with the slats extending between said pair of chains. With such a construction we find that the height of the moving floor at the rear door aperture can be as little as 3" (185 mm), thus giving a saving of the order of 9" (239 mm) over known moving floor constructions.

We find that we can provide the required power to drive the moving floor using relatively compact electric motors such as those provided for marine applications, driven through a reduction drive. Such motors are smaller than motors commonly used for driving moving floors so allowing for a small height reduction at the drive end, say (7½") 180 mm instead of say 12" (305 mm). Existing moving floor units employ only one such motor of high power to cater for all typical cargo loading requirements. In contrast we cater for increased power requirements by providing additional motors. In fact, we prefer to have the floor segmented longitudinally with a motor for each segment i.e. split into second longitudinal runs disposed side by side. Thus, each motor driving through a reduction gear box, drives its own pair of sprockets around which we entrain the chains and slats of that floor module. Thus, two, three or four modules may be provided, with the number of modules being largely determined by loading requirements. Usually where such multiple modules are provided they will be driven simultaneously, but it is envisaged that in certain applications it can be advantages to have independent control of some or all of the modules. This can be provided without undue difficulty.

We find that a particularly economical construction of slatted conveyor results where round tube, say of steel, is squashed into a substantially oval or lozenge shape allowing for introduction of plugs connectable to links of said chain in a push fit manner. Such plugs are conveniently of a plastics material such as nylon. The slats are preferably provided with a corrosion resistant coating.

An alternative providing the additional strength for some requirements is to have such slats made as extrusions, say of aluminium.

The present invention will now be described further, by way of example only with reference to the accompanying drawings, in which:

FIG. 2 is a ghosted perspective view of a vehicle body illustrating one embodiment of the invention;

FIG. 3 is a broken-away detail view of the floor construction;

FIG. 4 is a perspective view of drive sprocket detail; and

Figure 1:
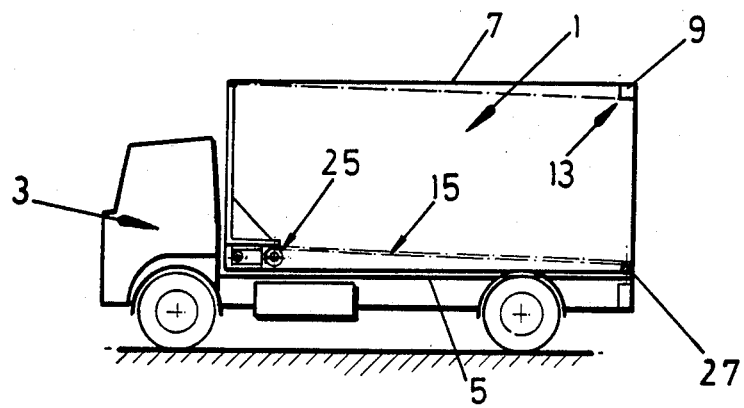
FIG. 1 is a side view illustrating a moving floor in a vehicle body in accordance with the present invention.
Figure 5:
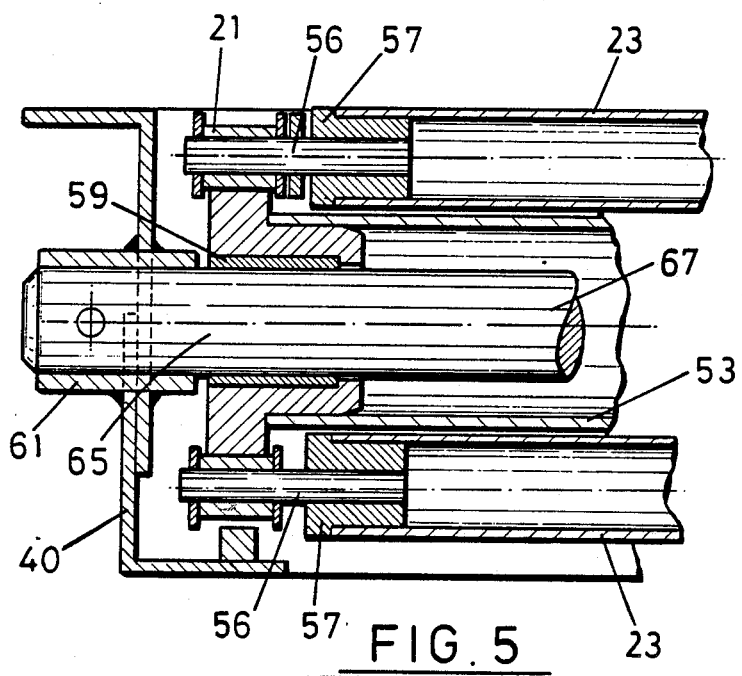
FIG. 5 is a sectional view showing return pulley detailing.

Referring to the drawings, there is shown a body 1, of typical box shape, and a vehicle 3. It will be appreciated that the body 1 could equally be part of a box trailer or be a demountable container body, but for convenience is illustrated with reference to a simple box van. The body has a floor 5, usually solid to prevent ingress of foreign material, say thrown up from the road surface, a roof 7 parallel to the floor and four sides, with the rear side bearing defined by a frame 9 for a pair of rear doors 11. The door frame aperture is made up of box section, usually steel or the like, of considerable section, thus projecting downwardly at lintel 13 relative to height of the roof 7 from the floor. Access height is thus restricted. The afore-described construction is typical of most vehicle or container bodies.

Disposed within the body and on top of the floor 5 is the moving floor 15 of the present invention which in the illustrated embodiment is split longitudinal into two modules 15a, 15b disposed side by side.

Each module of the moving floor is made up of a pair of endless chains 21 spaced apart transversely and having coupled thereto along part of their length a plurality of slats 23, one end of which is shown in further detail in FIG. 3. The endless chains are entrained at one end around a respective toothed drive sprocket 25 and at the other end round a simple axle like roller 27.

The drive sprockets 25 are of larger diameter than the axle like roller which gives rise to the tapered configuration. For convenience the axle like roller 27 comprises for each chain 21 a respective idle roller 65 received rotatably on an axle 67 by way of plain bearing 59. The axle 67 is carried in sleeving 61 of framework 40 of the moving floor. The rollers 65 are received in the opposite ends of a tube 63 for location and spacing purposes.

The two pairs of chains in the illustration are each driven from their own motors as at 29, 31. The respective motors drive through a right angle drive 33 and then into a reduction gear box 35 using a gear or chain type reduction mechanism giving a reduction of approximately 4:1. The motors are mounted on framework 40 forming part of the moving floor assembly, which framework provides for mounting of a drive shaft carrying the sprockets 25 and the roller 27 in suitable bearing blocks as at 39. The framework extends longitudinally to provide supports for the chain and/or slats of the conveyor and hence any load on the moving floor. Such a framework carrying the parts of the moving floor may be readily assembled onto the insitu floor of a vehicle container or body and fixed in position.

As illustrated, the slats extend over one run of the chains, with a head board 41 having a base 43 and an upstand 45 being secured to the chains so as to form the forward end of the moving floor. The base 43 serves as a convenient cover for the motor mechanism in the forward position, whilst the upstand 45 prevents cargo passing the forward end of the conveyor. Safety switches operate to switch off drive to the moving floor when the head board reaches its forward position. The head board may be in separate sections as illustrated one for each module where the modules are drivable separately, or can be constructed as one unit where the modules are to be driven together. Indeed the head board can then serve as the linking member, although drive axles 50 may also be linked. The upstand and base are conveniently braced as at 51. An access door is shown at 52.

It will be seen then that the moving floor is angled relative to the floor and/or roof of the body, thus giving the extra room at the entry point for additional height of cargo and/or accommodating pick up and put down of the load when palletized. The height of the load is represented by the chain dotted line in FIG. 1 from which it can be seen that cargo space is utilized better than would be the case where the moving floor is parallel with the body floor and/or roof.

The slatted conveyor is conveniently made up of pairs of chains as described with the slats being coupled to each chain by two pegs 55 at each end of the slat. This locates the slat non rotatably relative to the chain. The slats are of any desired cross-section but particularly convenient is the use of an oval providing a flattened load carrying surface 56 and rounded ends facilitating movement of the slots around the end bearing roller 27. The slots may be formed as extrusions or more preferably from tube, fitted with end plugs 57 for receiving the two pegs 55. Round tube may be formed into the desired shape simply by flattening it with internal formers in position. Where required the slatted conveyor may be constructed as a sealed surface by provision of sealing strips between the slats or a membrane over all the slats. In such a case the floor of the body need not be solid, but simply a skeleton on which the moving floor is mounted.

Control for the moving floor can be provided by way of a conveniently mounted switch panel say at the rear of the body. The motor we employ can utilize the battery of the vehicle as their power source or have their own battery charged up from the vehicle engine.

In use for loading, the moving floor starts off in a position substantially as illustrated by the left module in FIG. 2 with the majority of the slats on the underside run of the conveyor. Cargo may be loaded onto the exposed section of floor. The motor is then operated to draw the header toward the motors by an amount sufficient to allow the next palletized cargo unit to be loaded onto the floor. The operation is repeated until the container is full and the moving floor in the position as illustrated on the right of FIG. 2. Unloading is the reverse of this process.

I claim:

1. A box-like cargo holding body having a length, a roof line, a lintel which projects below the roof line, an underside of the lintel, a movable cargo loading surface, a loading aperture defined between the underside of the lintel and the movable cargo loading surface, a maximum permissible cargo load height dictated by a distance between the underside of the lintel and the movable cargo loading surface, which distance is fixed, and a moving floor to the body providing said movable cargo loading surface which moving floor has a constant slope over its length and is maintained at that slope such that it is at progressively reduced spacing from the roof line in a direction along its length from the loading aperture into the body and over the length of the body and wherein a minimum spacing is at least equal to the maximum permissible cargo load height.

2. A body according to claim 1 in which the moving floor comprises large and small pulley means and an endless conveyor means entrained around said pulley means and the movable cargo loading surface is part of the endless conveyor means, and wherein the large and small pulley means dictates that the moving floor has a depth which decreases over its length toward a loading end thereof.

3. A body according to claim 2 in which the small pulley means at the loading end comprises a plain bush-like bearing 4. A body according to claim 3 in which the plain bush-like bearing is a low friction plastics material.

5. A body according to claim 2 in which the large pulley means is toothed for cooperation with the conveyor means to provide drive thereto.

6. A body according to claim 2 in which the conveyor means comprises at least one pair of endless chains disposed side by side and carrying between each pair transverse slats forming at least part of the cargo loading surface.

7. A body according to claim 6 in which each slat comprises a hollow tube of a substantially oval or lozenge shape in cooperating engagement at each end with a link of the respective chains.

8. A body according to claim 1 in which a drive to the moving floor is from at least one drive motor accommodated within the depth of the moving floor.

9. A body according to claim 2, in which the conveyor means has an upstanding header secured thereto to define a forward end of the movable cargo loading surface.

* * * * *